United States Patent
Figueredo de Santana et al.

(10) Patent No.: US 11,709,764 B2
(45) Date of Patent: Jul. 25, 2023

(54) CREATING TEST CASES FOR TESTING SOFTWARE USING ANONYMIZED LOG DATA

(71) Applicant: International Business Machines Corporation, Armonk, NY (US)

(72) Inventors: Vagner Figueredo de Santana, São Paulo (BR); Sheldon Busby, Stone Mountain, GA (US); Gray Franklin Cannon, Atlanta, GA (US); Marco Aurelio Stelmar Netto, São Paulo (BR); Patrick Veedock, Roswell, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/194,668

(22) Filed: Mar. 8, 2021

(65) Prior Publication Data
US 2022/0283930 A1    Sep. 8, 2022

(51) Int. Cl.
*G06F 11/36* (2006.01)
*G06F 21/62* (2013.01)

(52) U.S. Cl.
CPC ...... *G06F 11/3684* (2013.01); *G06F 11/3688* (2013.01); *G06F 21/6254* (2013.01)

(58) Field of Classification Search
CPC ............. G06F 11/3684; G06F 11/3688; G06F 21/6254
See application file for complete search history.

(56) References Cited

U.S. PATENT DOCUMENTS 6,434,513 B1    8/2002    Sherman et al.
7,992,135 B1    8/2011    Wong et al.
(Continued)

FOREIGN PATENT DOCUMENTS

EP      3449414 A1      3/2019
WO   2017187207 A1   11/2017

OTHER PUBLICATIONS

J. Sedayao et al., "Making Big Data, Privacy, and Anonymization Work Together in the Enterprise: Experiences and Issues," 2014 IEEE International Congress on Big Data, Anchorage, AK, USA, 2014, pp. 601-607, doi: 10.1109/BigData.Congress.2014.92. (Year: 2014).*

(Continued)

*Primary Examiner* — Hanh Thi-Minh Bui
(74) *Attorney, Agent, or Firm* — Robert A. Voigt, Jr.; Shackelford, Bowen, McKinley & Norton, LLP

(57) ABSTRACT

A computer-implemented method, system and computer program product for generating test cases for testing software. Log files are analyzed for indications of software defects resulting in software errors. For those log files that were found to indicate software errors, such log files are analyzed to determine if they contain personal data that needs to be anonymized based on an entropy score of the personal data. When the entropy score of the personal data is below a threshold value, anonymized variations of the personal data are generated. Trace logs are then created containing the anonymized variations of the personal data, which are returned to a software tester to create a test case for testing software using the created trace logs without having access to personal data. In this manner, the software tester may reproduce the software errors without having access to the personal data.

20 Claims, 8 Drawing Sheets

(56) References Cited

U.S. PATENT DOCUMENTS

| | | | |
|---|---|---|---|
| 8,166,313 | B2 | 4/2012 | Fedtke |
| 8,504,348 | B2 | 8/2013 | Error |
| 8,775,603 | B2 | 7/2014 | Hansen |
| 8,909,771 | B2 | 12/2014 | Heath |
| 9,430,360 | B2 | 8/2016 | Bhattacharya et al. |
| 9,923,900 | B2 | 3/2018 | Goodwin et al. |
| 10,628,608 | B2 | 4/2020 | Hebert et al. |
| 10,698,756 | B1* | 6/2020 | Abdelsalam ........ G06F 11/3072 |
| 2014/0019391 | A1 | 1/2014 | Kortum et al. |
| 2014/0298093 | A1* | 10/2014 | Cook ................ G06F 11/0706 714/27 |
| 2015/0074648 | A1* | 3/2015 | Tai ..................... G06F 11/3688 717/124 |
| 2015/0100406 | A1 | 4/2015 | Klimetschek et al. |
| 2016/0328282 | A1* | 11/2016 | Rogati .............. G06F 11/0766 |
| 2020/0394054 | A1* | 12/2020 | Galoso ................. G06F 9/451 |
| 2021/0157665 | A1* | 5/2021 | Rallapalli ........... G06F 11/3068 |

OTHER PUBLICATIONS

Siavash Ghiasvand and Florina M. Ciorba, "Assessing Data Usefulness for Failure Analysis in Anonymized System Logs," 2018, pp. 1-11. Retrieved from the Internet: <URL: https://arxiv.org/pdf/1805.01790.pdf> (Year: 2018).*

Andrea Arcuri, "RESTful API Automated Test Case Generation," arXiv:1901.01538v1, Jan. 6, 2019, pp. 1-13.

"Test Case Generator Online," https://www.postocapixaba.com.br/watch-not-dfyduzp/test-case-generator-online-4052d3, 2020, pp. 1-6.

IBM, "IBM QRadar Security Intelligence Platform V7.3.0 Documentation," https://www.ibm.com/support/knowledgecenter/en/SS42VS_7.3.0/com.ibm.archive.doc/qradar_IC_welcome.html, 2020, pp. 1-2.

Ghiasvand et al., "Anonymization of System Logs for Privacy and Storage Benefits," arXiv:1706.04337v1, Jun. 14, 2017, pp. 1-8.

Dataveil Technologies, "What are DataVeil and FileMasker?," https://www.dataveil.com/ 2020, pp. 1-7.

Santana et al., "Summarizing Observational Client-Side Data to Reveal Web Usage Patterns," Proceedings of the 2010 ACM Symposium on Applied Computing, Sierre, Switzerland, Mar. 22-26, 2010, pp. 1219-1223.

Peter Eckersley, "How Unique is Your Web Browser?," International Symposium on Privacy Enhancing Technologies, 2010, pp. 1-19.

Anonymously, "A Method for Enhancing the Logging and Reporting of Sensitive Data for Aiding in the Analysis of Problems," IP.com, IPCOM000195028D1, Apr. 19, 2010, pp. 1-2.

Portillo-Dominguez et al., "Towards an Efficient Log Data Protection in Software Systems Through Data Minimization and Anonymization," 7th International Conference in Software Engineering Research and Innovation, 2019, pp. 1-9.

S. N. W. Oostdam, "Extending Traditional Request Logging: What Developers Require From Logging Solutions and Anonymization of Privacy Sensitive Information in Logs," Theses, Endhoven University of Technology, May 2019, pp. 1-79.

Santana et al., "Welfit: A Remote Evaluation Tool for Identifying Web Usage Patterns Through Client-Side Logging," International Journal of Human-Computer Studies, vol. 76, Apr. 2015, pp. 40-49.

* cited by examiner

| | 601 | 602 | 603 | 604 |
|---|---|---|---|---|
| Unmodified Data Elements | Device Model | Operating System | Browser | Referring Site |
| | iPhone 11 | iOS 13.1.3 | Safari 13.0.5 | graycannon.com |
| Debug Value for Element Type | 0.75 | 0.75 | 0.75 | 0.25 |
| Element Occurences in Data Set | 2 | 1 | 3 | 1 |
| Failure Rate for Element | 0.50 | 1.00 | 1.00 | 1.00 |
| Unmodified Debug Value | 0.38 | 0.75 | 0.75 | 0.25 |
| Unmodified Element Entropy | 1.00 | 0.00 | 1.58 | 0.00 |
| Debug Value * Element Entropy | 0.38 | 0.00 | 1.19 | 0.00 |

| Unmodified Full Vector Entropy | 0.00 |
|---|---|

| | 601 | 602 | 603 | 604 |
|---|---|---|---|---|
| Modified Data Elements | Device Model | Operating System | Browser | Referring Site |
| | N/A | iOS 13.1.3 | Safari 13.0.5 | N/A |
| Debug Value for Element Type | 0.75 | 0.50 | 0.75 | 0.25 |
| Element Occurences in Data Set | #N/A | 2 | 3 | #N/A |
| Failure Rate for Element | #N/A | 1.00 | 1.00 | #N/A |
| Modified Debug Value | #N/A | 0.50 | 0.75 | #N/A |
| Modified Element Entropy | #N/A | 1.00 | 1.58 | #N/A |
| Debug Value * Element Entropy | | 0.50 | 1.19 | |

| Modified Full Vector Entropy | 1.00 |
|---|---|

FIG. 6

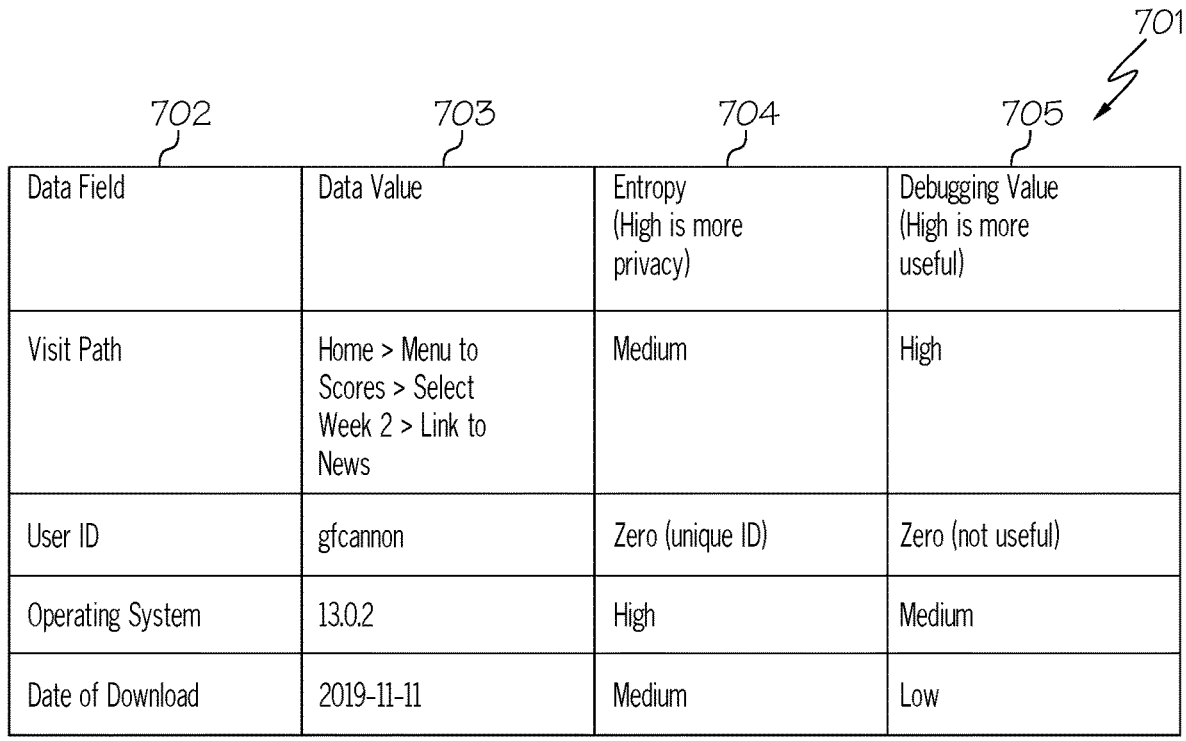
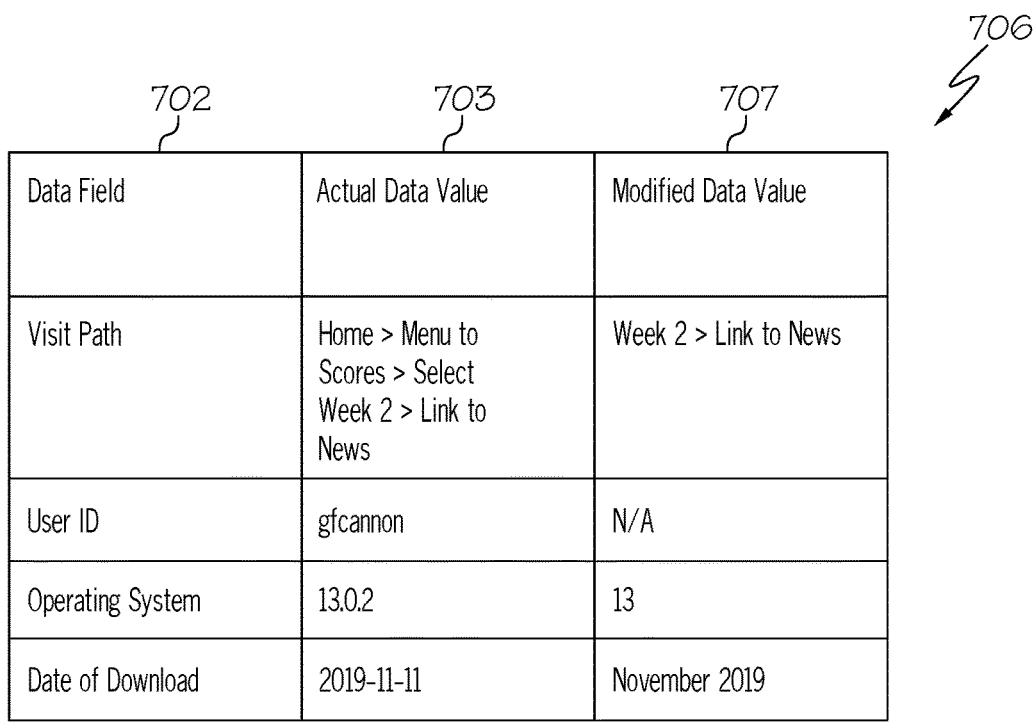
FIG. 7

US 11,709,764 B2

CREATING TEST CASES FOR TESTING SOFTWARE USING ANONYMIZED LOG DATA

TECHNICAL FIELD

The present disclosure relates generally to software development, and more particularly to creating test cases for testing software using anonymized log data.

BACKGROUND

In recent years, there has been a trend in software development to identify, reproduce and solve software defects ("bugs") as quickly as possible. A software defect is an error, flaw or fault in a computer program or system that causes it to produce an incorrect or unexpected result, or to behave in unintended ways.

Such defects may only occur under certain combinations of user activity and device characteristics. As a result, software developers may utilize such information (user activity and device characteristics) to identify, reproduce and solve software defects.

SUMMARY

In one embodiment of the present disclosure, a computer-implemented method for generating test cases for testing software comprises identifying personal data to be anonymized in a log file that was previously identified as indicating a software error based on an entropy score of the personal data. The method further comprises generating an anonymized variation of the identified personal data. The method additionally comprises creating one or more log traces containing the anonymized variation of the personal data. Furthermore, the method comprises returning the created one or more log traces containing the anonymized variation of the personal data to a software tester to create a test case for testing software using the created one or more log traces.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 6 illustrates the anonymized variations of personal data identified in the log files in accordance with an embodiment of the present disclosure;

FIG. 7 illustrates an example of modifying data values within data fields of a log file to anonymize personal data prior to creating a development task and test case in accordance with an embodiment of the present disclosure.

DETAILED DESCRIPTION

Figure 1:
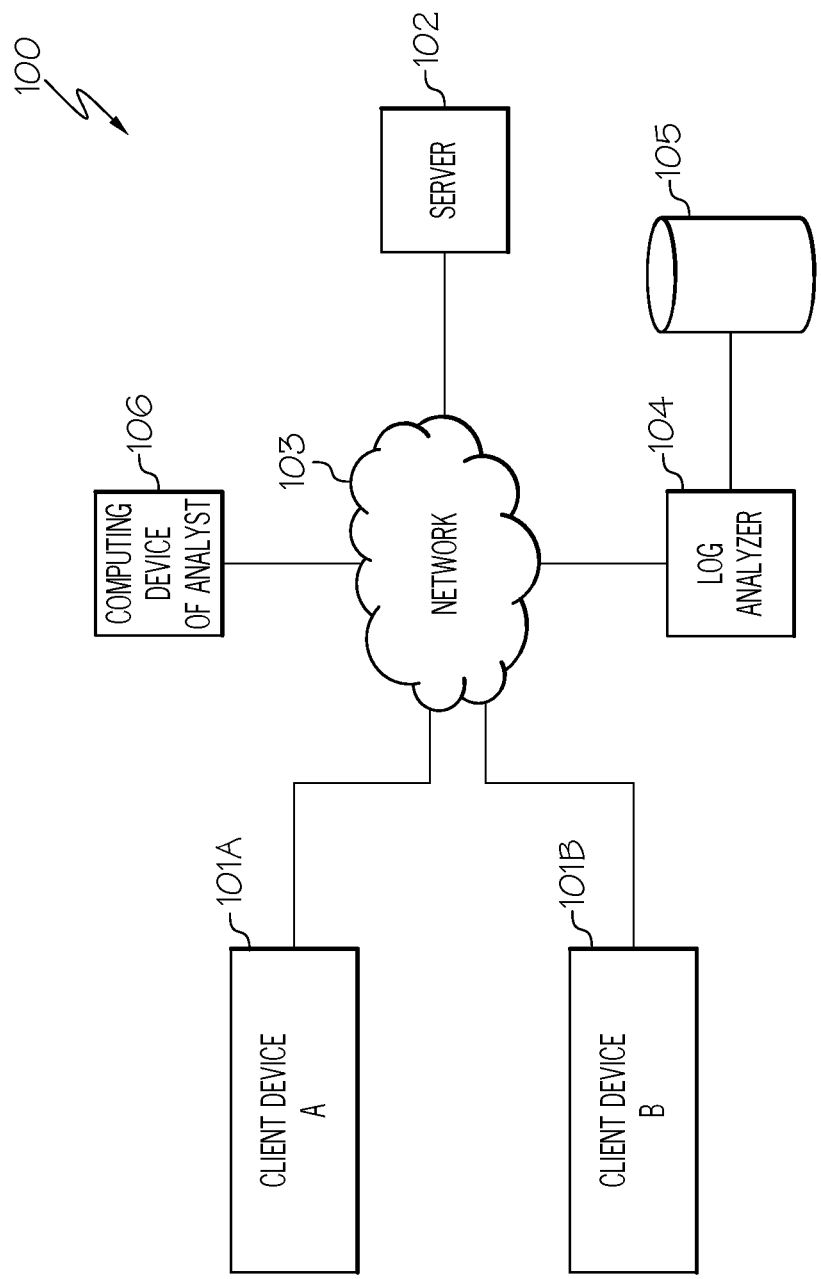
FIG. 1 illustrates a communication system for practicing the principles of the present disclosure in accordance with an embodiment of the present disclosure.

As stated in the Background section, in recent years, there has been a trend in software development to identify, reproduce and solve software defects ("bugs") as quickly as possible. A software defect is an error, flaw or fault in a computer program or system that causes it to produce an incorrect or unexpected result, or to behave in unintended ways.

Such defects may only occur under certain combinations of user activity and device characteristics. As a result, software developers may utilize such information (user activity and device characteristics) to identify, reproduce and solve software defects.

However, by combining seemingly non-identifying user data (user activity and device characteristics), individual users may be uniquely identified. As a result, by analyzing such data, software developers may expose users' personal data to levels they did not consent.

Furthermore, there are regulations, such as the General Data Protection Regulation (GDPR), on data protection and privacy. The aim of such regulations is to give individuals control over their personal data. Furthermore, such regulations may mandate that all access of user data should be clearly informed.

However, in identifying, reproducing and solving software defects by combining user activity and device characteristics, software developers may not only expose users' personal data to levels they did not consent but may possibly violate regulations, such as the GDPR.

As a result, attempts have been made to obfuscate or anonymize personal data.

However, such attempts may fail to prevent uniquely identifying individuals by combining seemingly non-identifying user data (e.g., user activity and device characteristics). For example, current methods to obfuscate or anonymize personal data focus on anonymizing only profile data. Such methods do not consider the possibility of combining attributes in a manner that allows individual identification.

Consequently, there is not currently a means for identifying, reproducing and solving software defects by combining seemingly non-identifying user data (e.g., user activity and device characteristics) without the possibility of exposing users' personal data to levels they did not consent and possibly violating regulations, such as the GDPR.

The embodiments of the present disclosure provide a means for identifying, reproducing and solving software defects by combining seemingly non-identifying user data (e.g., user activity and device characteristics) without exposing users' personal data and violating regulations, such as the GDPR, by creating test cases for testing software using anonymized log data.

In some embodiments of the present disclosure, the present disclosure comprises a computer-implemented method, system and computer program product for generating test cases for testing software. In one embodiment of the present disclosure, log files are analyzed for indications of software defects resulting in software errors. "Log files," as used herein, contain a record of the user interaction data and device characteristics (e.g., operating system, device model) which have been "logged" by a computing device. In one embodiment, such log files that indicate software errors are identified via session graphs of expected user interaction data and device characteristics (e.g., expected user interaction behavior). For those log files that were found to indicate software errors, such log files are analyzed to determine if they contain personal data that needs to be anonymized based on an entropy score of the personal data. The entropy score is a score indicating the randomness or uncertainty of the personal data. When the entropy of the personal data is below a threshold value, personal data that needs to be anonymized may be said to be identified. After identifying the personal data that needs to be anonymized, anonymized variations of the personal data are generated based, at least in part, on a "usefulness score." Such "usefulness scores" correspond to a value that represents the extent that the data elements of the personal data are utilized, including in being advantageous or helpful in resolving software defects. Trace logs are then created containing the anonymized variations of the personal data, which is returned to a software tester to create a test case for testing software using the created trace logs without having access to personal data. Software is then tested using the created test case to reproduce the software errors. In this manner, the software tester may reproduce the software errors without having access to the personal data.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes client devices 101A-101B (identified as "Client Device A," and "Client Device B," respectively) connected to a server 102 via a network 103.

Client devices 101A-101B may collectively or individually be referred to as client devices 101 or client device 101, respectively. It is noted that both client devices 101 and the users of client devices 101 may be identified with element number 101.

Client device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other client devices 101 and server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, client devices 101 may store "user interaction data" in "log files," which are stored in a storage device (e.g., memory, disk drive) of client device 101. "User interaction data," as used herein, refers to the user interactions with client device 101, such as the movement of the mouse, typing of the keys of the keyboard, clicks of a mouse, etc. to perform a command, such as a purchase of a product on a website. "Log files," as used herein, contain a record of the user interaction data and device characteristics (e.g., operating system, device model) which have been "logged" by a computing device. In one embodiment, such behavioral characteristics, such as user interaction data, may be used as a password to authenticate the user as only the user would have such interactions. In this manner, access to the user's data may be prevented from unauthorized users. Furthermore, log files, as used herein, may contain information about usage patterns, activities and operations within an operating system, application, server or another device. In one embodiment, log files are generated by web servers, software installers, software utilities, file transfer protocol programs, operating systems, etc. For example, such log files may be found on client devices 101 and server 102.

In one embodiment, server 102 is a web server configured to offer a social networking and/or microblogging service thereby enabling users of client devices 101 to send and read other users' posts. "Posts," as used herein, include any one or more of the following: text (e.g., comments, sub-comments and replies), audio, video images, etc. Server 102, as used herein, is configured to enable various collaborative activities, such as online discussion sites (e.g., public forums).

In one embodiment, server 102 is configured to generate log files, which includes a record of the user interaction data, such as a record of the user of client device 101 purchasing a product on a website. In one embodiment, such log files may be stored in server 102, such as in a storage device (e.g., memory, disk drive) of server 102, or in a database (e.g., database 105 discussed below).

In one embodiment, log files may also include web analytics data containing user interaction data and device characteristics. "Web analytics," as used herein, is the measurement, collection, analysis, and reporting of web data to understand and optimize web usage. Such data may be stored in log files, which are stored in a storage medium (e.g., memory, disk drive) of server 102.

Furthermore, as shown in FIG. 1, communication system 100 includes a log analyzer 104 connected to network 103 via wire or wirelessly. Log analyzer 104 is configured to generate anonymized variation of personal data, such as user interaction data and device characteristics, so to prevent exposure of the user's personal data. Furthermore, log analyzer 104 is configured to create log traces containing the anonymized variations of the personal data, which is used to create test cases to test the software by the software tester without having access to the user's personal data. In this manner, software defects may be identified, reproduced and solved without exposing users' personal data and violating regulations, such as GDPR. A further description of these and other functions are provided further below. Furthermore, a description of the software components of log analyzer 104 is provided below in connection with FIG. 2 and a description of the hardware configuration of log analyzer 104 is provided further below in connection with FIG. 3.

In one embodiment, log files are generated from the execution of test cases by log analyzer 104, which are stored in a database 105 connected to log analyzer 104. A "test case," as used herein, refers to a specification of the inputs, execution conditions, testing procedure and expected results that define a single test to be executed to achieve a particular software testing objective, such as to exercise a particular program path or to verify compliance with a specific requirement.

In one embodiment, terminal or console output, such as test output delivered via the standard out (stout) stream or error messages delivered via the standard error (stderr) stream may be redirected to log files, which may be stored in database 105.

As discussed above, log analyzer 104 creates log traces containing anonymized variations of the personal data. Such log traces may be sent to a computing device 106 of an analyst (e.g., software developer) which is used to create the test cases to test the software.

System 100 is not to be limited in scope to any one particular network architecture. System 100 may include any number of client devices 101, servers 102, networks 103, log analyzers 104, databases 105 and computing devices 106 of analysts.

A discussion regarding the software components used by log analyzer 104 to perform the functions of anonymizing variations of personal data is discussed below in connection with FIG. 2.

Figure 2:
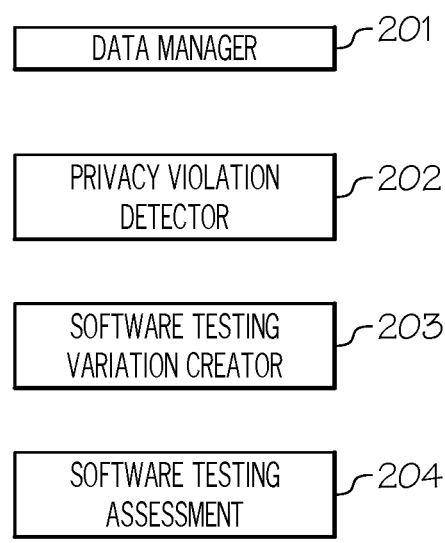
FIG. 2 is a diagram of the software components of the log analyzer used to generate log files with anonymized variations of personal data in accordance with an embodiment of the present disclosure.

FIG. 2 is a diagram of the software components of log analyzer 104 (FIG. 1) used to generate log files with anonymized variations of personal data in accordance with an embodiment of the present disclosure.

Referring to FIG. 2, in conjunction with FIG. 1, log analyzer 104 includes a data manager 201 configured to analyze log files for software defects resulting in software errors. Log analyzer 104 further includes a privacy violation detector 202 configured to analyze log files that were identified as indicating software errors to determine if they contain any personal data. Log analyzer 104 additionally includes a software testing variation creator 203 configured to create the scenarios for software testing. Software testing variation creator 203 is further configured to generate anonymized variations of personal data. Log analyzer 104 additionally includes a software testing assessment 204 configured to assess the software testing variation with respect to metrics related to privacy and coverage to detect software defects. Software testing assessment 204 is further configured to calculate "data element usefulness scores," which are used to evaluate the extent to which a value of a data element of personal data can be transformed.

A further description of these and other functions is provided below in connection with the discussion of the method for generating test cases for testing software based on log files that include anonymized personal data.

Prior to the discussion of the method for generating test cases for testing software based on log files that include anonymized personal data, a description of the hardware configuration of log analyzer 104 (FIG. 1) is provided below in connection with FIG. 3.

Figure 3:
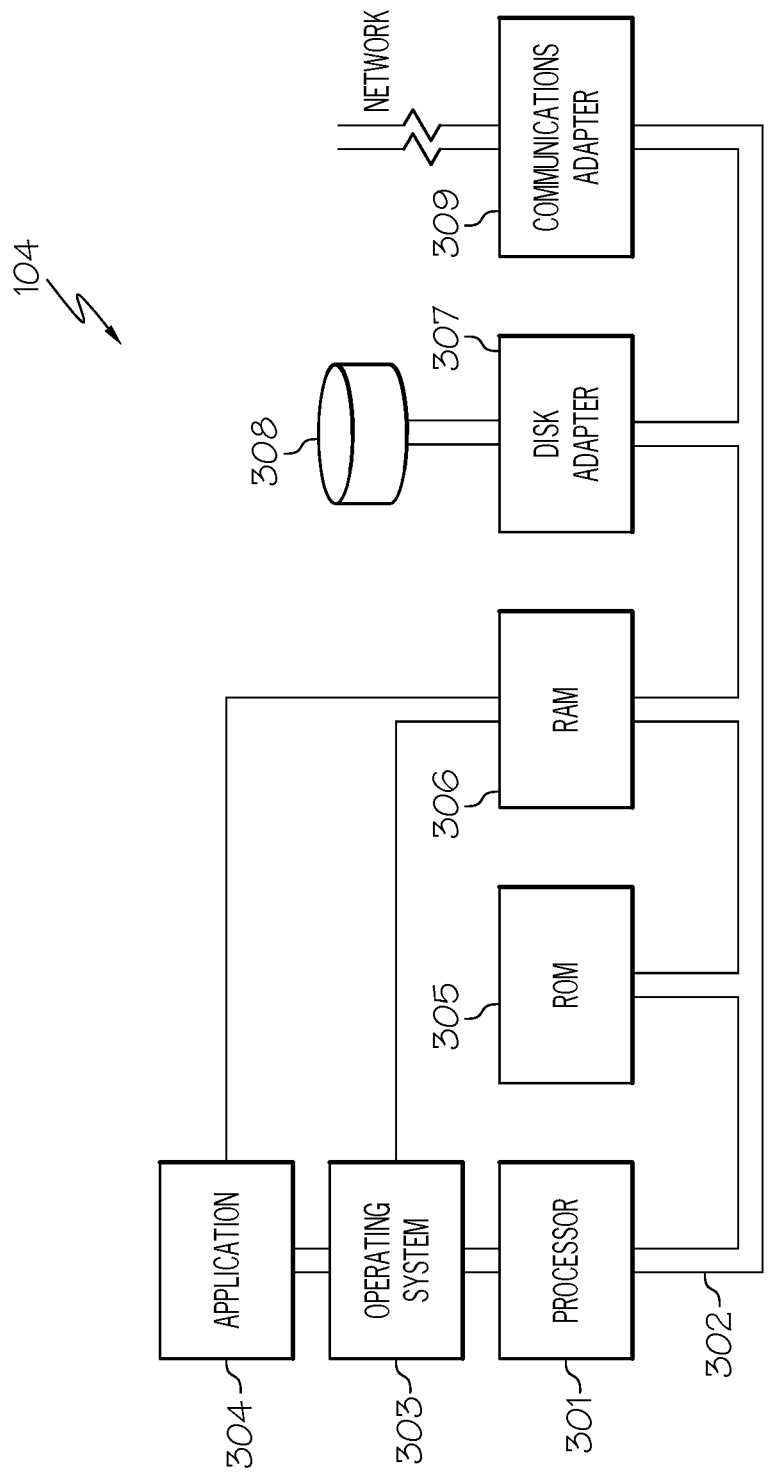
FIG. 3 illustrates an embodiment of the present disclosure of the hardware configuration of the log analyzer which is representative of a hardware environment for practicing the present disclosure.

Referring now to FIG. 3, FIG. 3 illustrates an embodiment of the present disclosure of the hardware configuration of log analyzer 104 (FIG. 1) which is representative of a hardware environment for practicing the present disclosure.

Log analyzer 104 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, data manager 201 (FIG. 2), privacy violation detector 202 (FIG. 2), software testing variation creator 203 (FIG. 2), and software testing assessment 204 (FIG. 2). Furthermore, application 304 may include, for example, a program for generating test cases for testing software based on log files that include anonymized personal data as discussed further below in connection with FIGS. 4-8.

Referring again to FIG. 3, read-only memory ("ROM") 305 is connected to system bus 302 and includes a basic input/output system ("BIOS") that controls certain basic functions of log analyzer 104. Random access memory ("RAM") 306 and disk adapter 307 are also connected to system bus 302. It should be noted that software components including operating system 303 and application 304 may be loaded into RAM 306, which may be log analyzer's 104 main memory for execution. Disk adapter 307 may be an integrated drive electronics ("IDE") adapter that communicates with a disk unit 308, e.g., disk drive. It is noted that the program for generating test cases for testing software based on log files that include anonymized personal data, as discussed further below in connection with FIGS. 4-8, may reside in disk unit 308 or in application 304.

Log analyzer 104 may further include a communications adapter 309 connected to bus 302. Communications adapter 309 interconnects bus 302 with an outside network (e.g., network 103 of FIG. 1) to communicate with other devices, such as client devices 101, server 102, computing device 106 of an analyst, etc.

In one embodiment, application 304 of log analyzer 104 includes the software components of data manager 201, privacy violation detector 202, software testing variation creator 203, and software testing assessment 204. In one embodiment, such components may be implemented in hardware, where such hardware components would be connected to bus 302. The functions discussed above performed by such components are not generic computer functions. As a result, log analyzer 104 is a particular machine that is the result of implementing specific, non-generic computer functions.

In one embodiment, the functionality of such software components (e.g., data manager 201, privacy violation detector 202, software testing variation creator 203, and software testing assessment 204) of log analyzer 104, including the functionality for generating test cases for testing software based on log files that include anonymized personal data, may be embodied in an application specific integrated circuit.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, in recent years, there has been a trend in software development to identify, reproduce and solve software defects ("bugs") as quickly as possible. A software defect is an error, flaw or fault in a computer program or system that causes it to produce an incorrect or unexpected result, or to behave in unintended ways. Such defects may only occur under certain combinations of user activity and device characteristics. As a result, software developers may utilize such information (user activity and device characteristics) to identify, reproduce and solve software defects. However, by combining seemingly non-identifying user data (user activity and device characteristics), individual users may be uniquely identified. As a result, by analyzing such data, software developers may expose users' personal data to levels they did not consent. Furthermore, there are regulations, such as the General Data Protection Regulation (GDPR), on data protection and privacy. The aim of such regulations is to give individuals control over their personal data. Furthermore, such regulations may mandate that all access of user data should be clearly informed. However, in identifying, reproducing and solving software defects by combining user activity and device characteristics, software developers may not only expose users' personal data to levels they did not consent but may possibly violate regulations, such as the GDPR. As a result, attempts have been made to obfuscate or anonymize personal data. However, such attempts may fail to prevent uniquely identifying individuals by combining seemingly non-identifying user data (e.g., user activity and device characteristics). For example, current methods to obfuscate or anonymize personal data focus on anonymizing only profile data. Such methods do not consider the possibility of combining attributes in a manner that allows individual identification. Consequently, there is not currently a means for identifying, reproducing and solving software defects by combining seemingly non-identifying user data (e.g., user activity and device characteristics) without the possibility of exposing users' personal data to levels they did not consent and possibly violating regulations, such as the GDPR.

Figure 4:
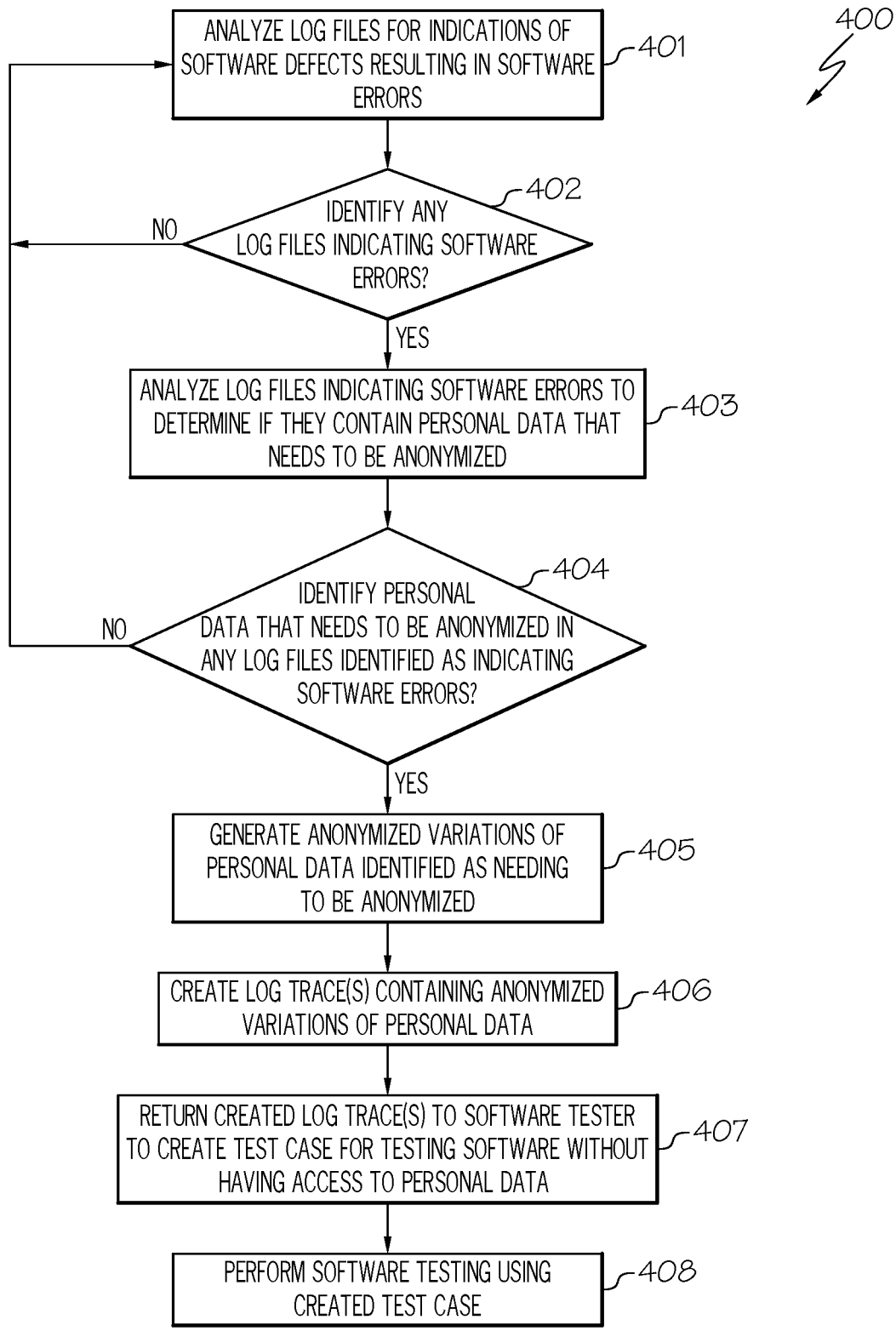
FIG. 4 is a flowchart of a method for generating test cases for testing software using log files with anonymized personal data in accordance with an embodiment of the present disclosure.
Figure 5:
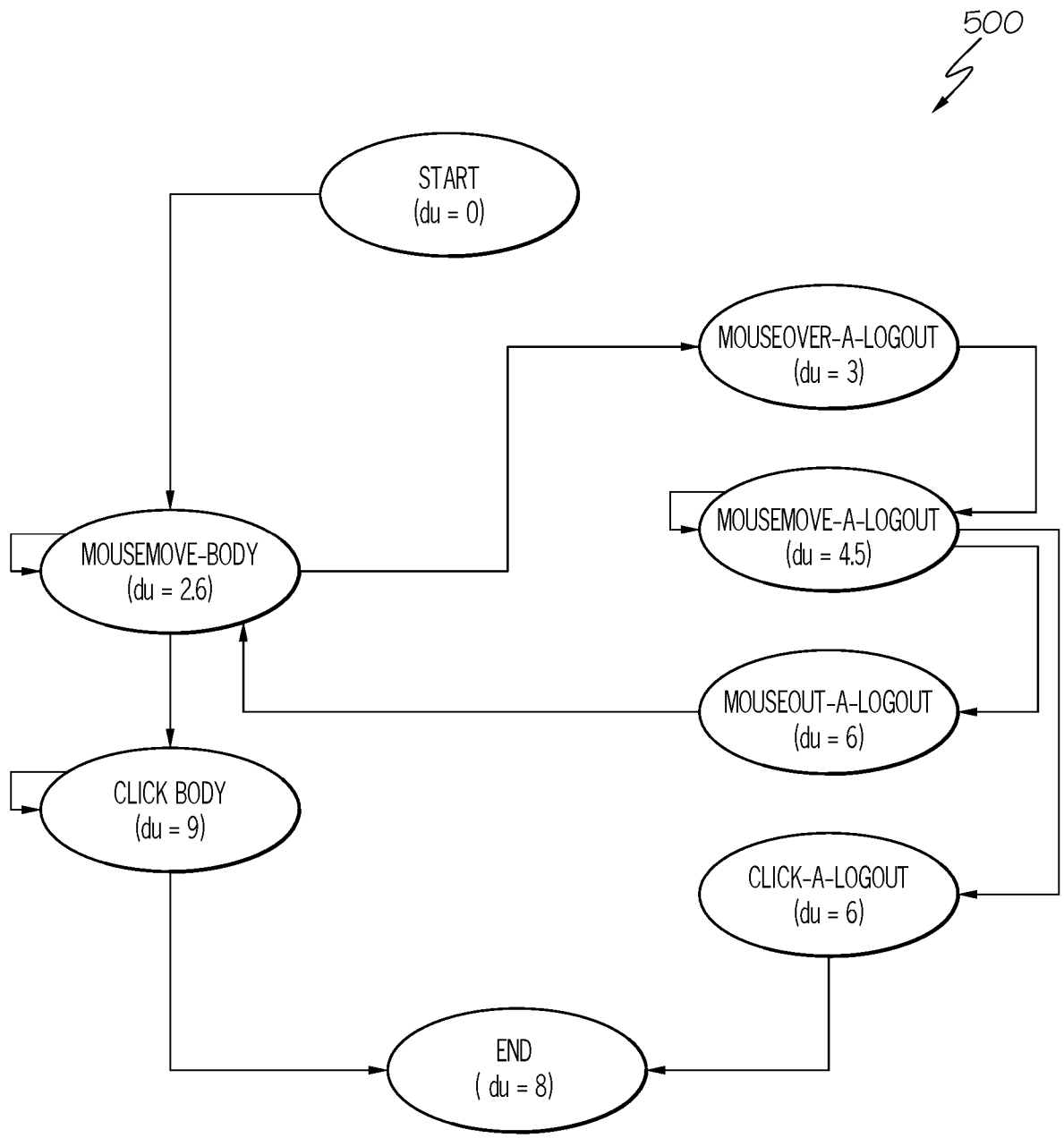
FIG. 5 is a diagram illustrating a session graph of appropriate user interactions in accordance with an embodiment of the present disclosure.
Figure 8:
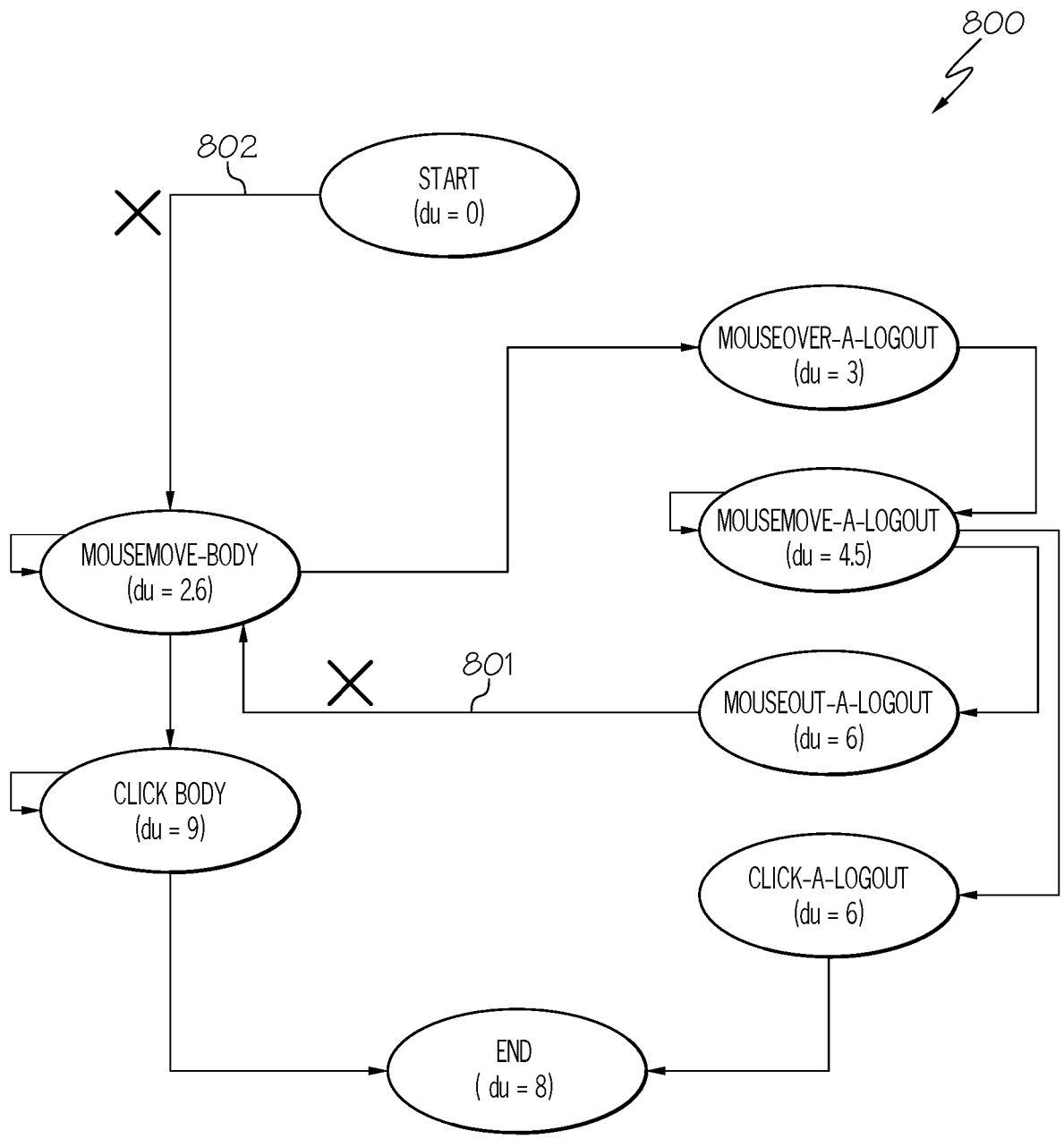
FIG. 8 illustrates the session graph of FIG. 5 modified to anonymize personal data, which is used to create log traces containing anonymized variations of personal data, in accordance with an embodiment of the present disclosure.

The embodiments of the present disclosure provide a means for identifying, reproducing and solving software defects by combining seemingly non-identifying user data (e.g., user activity and device characteristics) without exposing users' personal data and violating regulations, such as the GDPR, by creating test cases for testing software using log files with anonymized personal data as discussed below in connection with FIGS. 4-8. FIG. 4 is a flowchart of a method for generating test cases for testing software using log files with anonymized personal data. FIG. 5 is a diagram illustrating a session graph of appropriate user interactions. FIG. 6 illustrates the anonymized variations of personal data identified in the log files. FIG. 7 illustrates an example of modifying data values within data fields of a log file to anonymize personal data prior to creating a development task and test case. FIG. 8 illustrates the session graph of FIG. 5 modified to anonymize personal data, which is used to create log traces containing anonymized variations of personal data.

As discussed above, FIG. 4 is a flowchart of a method 400 for generating test cases for testing software using log files with anonymized personal data in accordance with an embodiment of the present disclosure.

Referring to FIG. 4, in conjunction with FIGS. 1-3, in step 401, data manager 201 of log analyzer 104 analyzes log files for indications of software defects resulting in software errors.

As previously discussed, "log files," as used herein, contain a record of the user interaction data and device characteristics (e.g., operating system, device model) which have been "logged" by a computing device. For example, user and device-specific information may include information, such as timestamp, interaction type, screen size, screen resolution, screen orientation, operating system type, operating system version, browser make and version, device model, client settings, etc.

Furthermore, log files, as used herein, may contain information about usage patterns, activities and operations within an operating system, application, server or another device. In one embodiment, log files may also include web analytics data containing user interaction data and device characteristics. "Web analytics," as used herein, is the measurement, collection, analysis, and reporting of web data to understand and optimize web usage, which may be stored in server 102. In one embodiment, log files are generated from the execution of test cases by log analyzer 104, which are stored in database 105 connected to log analyzer 104. In one embodiment, terminal or console output, such as test output delivered via the standard out (stout) stream or error messages delivered via the standard error (stderr) stream may be redirected to log files, which may be stored in database 105. In one embodiment, log files are generated by web servers, software installers, software utilities, file transfer protocol programs, operating systems, etc. For example, such log files may be found on client devices 101, server 102, database 105, etc.

In one embodiment, software defects resulting in software errors may be identified in log files, such as the log files discussed above, by data manager 201 of log analyzer 104 utilizing natural language processing to identify keywords (e.g., failure, error) used in the log file. In one embodiment, such failures may be associated with user and device-specific information (e.g., timestamp, interaction type, screen size, screen resolution, screen orientation, operating system type, operating system version, browser make and version, device model, client settings, etc.). Such data may be used to train a machine learning algorithm to build a machine learning model to identify software defects resulting in software errors from the log files based on the user and device-specific information recorded in the log files.

In one embodiment, software defects resulting in software errors may be identified in log files by data manager 201 of log analyzer 104 by comparing the application state against expected values for each user interaction (e.g., mouse movement) found in the log file, such as via session graphs (discussed further below). Such deviations from the expected values are flagged as errors (software errors).

In one embodiment, session graphs of expected user interaction data and device characteristics (e.g., expected user interaction behavior) are generated using user interaction data and/or device characteristics recorded in log files with no errors. For example, in one embodiment, data manager 201 of log analyzer 104 generates a session graph (e.g., directed graph) illustrating the user interactions and/or device characteristics as recorded in the log file. In one embodiment, a tool, such as the Industrial Control Communications (ICC) Modbus Master Tool, in connection with Microsoft® Excel, is used to graph the data in a log file. In one embodiment, the ICC Modbus Master Tool is used to extract the user and device-specific information from the log files into a spreadsheet, where such information is then presented as a graph. In one embodiment, the ICC Modbus Master Tool identifies the user and device-specific information using natural language processing by identifying keywords in the log files that are identified as corresponding to user and device-specific information. In one embodiment, such keywords may be stored in a database, such as database 105. Moreover, device characteristics and software versions can be retrieved using programming languages, such as Python®, Java®, PHP, Ruby, NodeJS, etc.

As discussed above, the ICC Modbus Master Tool is used to graph the data in a log file. For example, such a graph ("session graph") may illustrate the user interactions performed by a user (e.g., user of client device 101) and/or device characteristics of the device used by the user as shown in FIG. 5. FIG. 5 is a diagram illustrating a session graph 500 of appropriate user interactions in accordance with an embodiment of the present disclosure.

In another embodiment, such a session graph is generated by identifying user interactions and/or device characteristics in the log files using log analysis software tools, such as Splunk Enterprise, Dynatrace®, Datadag, Sumo Logic®, Graylog®, LogDNA®, LogicMonitor®, etc. Such identified user interactions and device characteristics are graphed into a session graph as shown in FIG. 5 using graphic tools, such as Librato®, Greckoboard, WELFIT, etc.

Referring to FIG. 5, session graph 500 illustrates various sequences of user interactions that do not lead to software errors as identified and depicted by data manager 201 of log analyzer 104 based on analyzing log files with no detected software errors and generating session graphs based on such analysis.

Once such graphs are established, the user interactions recorded in a log file that is associated with a software error may be compared with the steps of the user interactions depicted in these session graphs.

For example, if data manager 201 of log analyzer 104 identified the following user interactions recorded from the log file: mousemove-body, mousemove-body, mouseover-a-logout, mousemove-a-logout, mousemove-a-logout, mouseout-a-logout, mousemove-body, mousemove-body, click-body, click-body, and click-body, then a deviation or error (software error) may be identified based on the user interactions including a selection of "click-body" for three consecutive times as opposed to the two consecutive times shown in session graph 500 of FIG. 5.

In another example, if data manager 201 of log analyzer 104 identified the following user interactions recorded from the log file: mousemove-body, mousemove-body, mouseover-a-logout, mousemove-a-logout, mousemove-a-logout, and click-body, then a deviation or error (software error) may be identified based on the user interactions including a selection of "click-body" following the user interaction of "mousemove-a-logout" as opposed to selecting "mouseout-a-logout" or "click-a-logout."

Returning to FIG. 4, in conjunction with FIGS. 1-3 and 5, in step 402, a determination is made by data manager 201 of log analyzer 104 as to whether any log files were identified that indicated software errors.

If there were no logs files that were identified as indicating software errors, then data manager 201 of log analyzer 104 continues to analyze log files for indications of software defects resulting in software errors in step 401.

If, however, there were log files that were identified as indicating software errors, then, in step 403, privacy violation detector 202 of log analyzer 104 analyzes the log files that were identified as indicating software errors to determine if they contain any personal data that needs to be anonymized. "Personal data," as used herein, refers to any information relating to an identified or identifiable natural person. In one embodiment, as discussed further below, when the "entropy" of the data is below a threshold value, such data is identified as being personal data that needs to be anonymized.

In one embodiment, privacy violation detector 202 of log analyzer 104 identifies personal data within log files that were identified as indicating software errors using natural language processing by identifying names, identification numbers (e.g., social security numbers), location data, online identifiers, etc. that when used in combination with other user information can be used to identify a person. In one embodiment, such information (e.g., names, identification numbers) to be searched and identified within the log files using natural language processing may be determined based on the regulations (e.g., GDPR) on data protection and privacy.

In one embodiment, privacy violation detector 202 of log analyzer 104 identifies personal data that needs to be anonymized in the log files (log files that were previously identified as indicating a software error) by identifying fields in such log files containing user interaction data and device characteristics using natural language processing. In one embodiment, such fields (e.g., operating system, date of download) are identified by matching the fields found in a data structure (e.g., list) containing a listing of fields storing such information. In one embodiment, such a data structure is stored in a storage device (e.g., memory, disk drive) of log analyzer 104 or in repository 105.

In one embodiment, each of the attributes related to such user interaction data and device characteristics (e.g., timestamp, interaction type, screen size, screen resolution, screen orientation, operating system type, operating system version, browser make and version, device model, client settings, etc.) are placed in a feature vector. A "feature vector," as used herein, refers to an n-dimensional vector of numerical features that represent the user interaction data and device characteristics in the log files that were identified as indicating software errors.

Privacy violation detector 202 of log analyzer 104 then calculates the entropy of the feature vector to determine whether the feature vector contains personal data that needs to be anonymized. "Entropy," as used herein, refers to the randomness or uncertainty, such as the randomness of the data. In one embodiment, when the entropy score of the feature vector is below a threshold value, which may be user-specified, personal data is said to be identified that needs to be anonymized. An illustrative embodiment of the calculation for calculating the entropy of the feature vector is shown below.

$$D_F = \text{Debug Value for Element Type (Field)}$$

$$D_F = \frac{\text{Issues of Issue Type with Field Present in Issue Resolution Comment}}{\text{Total Resolved Issues of Issue Type}}$$

$$D_E = \text{Debug Value for Element}$$

$$F_E = \text{Test Case Failure Rate for Element}$$

$$D_E = D_F * F_E$$

$$H(X) = \text{Information Entropy (Uncertainty)}$$

$$H(X) = -\sum_{i=1}^{n} P(x_i) \log_2 P(x_i)$$

$$H(V) = \text{Entropy of Visitor Identification}$$

$$C_E = \text{Count of Test Cases Including Element}$$

$$H(V) = C_E * \left(\frac{-1}{C_E} * \log_2 \frac{1}{C_E}\right)$$

$$T = \text{Threshold for Keeping Unmodified Value}$$

$$G = \text{Granularity Level for Element Value (1 is the lowest specificity level)}$$

$$\begin{cases} D_E * H(V) \geq T \rightarrow \text{Retain Element Value in Log} \\ D_E * H(V) < T \wedge G > 1 \rightarrow \text{Recalculate with less granularity} \\ D_E * H(V) < T \wedge G = 1 \rightarrow \text{Remove Element from Log} \end{cases}$$

As shown above, the debug value ($D_F$) for the element type (field within the feature vector, such as the user identifier) corresponds to the number of issues of the issue type with the field present in the issue resolution comment (comments pertaining to resolved issues) divided by the total resolved issues of that issue type. In this manner, the debug value ($D_F$) for the element type (field within the feature vector) provides an indication as to whether the data in such a data field within the log file is useful or not. The more useful, the greater the benefit in anonymizing such data.

Furthermore, as shown above, the debug value ($D_E$) for the element (element of the feature vector) (e.g., data value of 13.0.2 for the operating system) corresponds to the debug value ($D_F$) for the element type (field within the feature vector) multiplied by the test case failure rate for the element (element within the feature vector). The test case error rate corresponds to the number of test cases for testing software involving this element that failed divided by the total number of test cases for testing software involving this element.

Additionally, as shown above, information entropy (H(X)) (also referred to as "Shannon entropy") corresponds to the entropy (uncertainty) of the information.

Additionally, as shown above, the entropy (randomness or uncertainty) of visitor identification (H(V)) is calculated using the count of test cases ($C_E$) including the element (element within feature vector). In one embodiment, such visitor identification refers to the identification of the users of client devices 101, such as those users visiting a website.

Furthermore, the threshold (T) discussed in the equations above corresponds to the threshold value that is used to determine whether personal data is said to be identified.

Additionally, the granularity level (G) discussed in the equations above corresponds to a user-specified parameter that corresponds to the level of specificity, which corresponds to the rate of false positive results.

In one embodiment, the element value (e.g., date of download of Dec. 1, 2019) in the log file is retained when $D_E*H(V) \geq T$. The parameter combination "$D_E*H(V)$," as used herein, is referred to as the "entropy score of the personal data." In one embodiment, the calculation discussed above is recalculated with less granularity when $D_E*H(V)<T^{\wedge}G>1$. In one embodiment, the element value in the log file is eligible for variation and removed when $D_E*H(V)<T^{\wedge}G=1$. That is, the element value in the log file is anonymized as discussed further below. In such a situation, it said that the entropy of the personal data is below the threshold value along with having a granularity level equal to 1.

Returning to FIG. 4, in conjunction with FIGS. 1-3 and 5, in step 404, a determination is made by privacy violation detector 202 of log analyzer 104 as to whether personal data was identified that needs to be anonymized in any of the log files identified as indicating software errors as discussed above.

If personal data that needs to be anonymized was not identified in any of the log files identified as indicating software errors, then data manager 201 of log analyzer 104 continues to analyze log files for indications of software defects resulting in software errors in step 401.

If, however, personal data that needs to be anonymized was identified in one or more log files identified as indicating software errors, then, for each such log file, in step 405, software testing variation creator 203 of log analyzer 104 generates anonymized variations of personal data identified as needing to be anonymized.

In one embodiment, software testing variation creator 203 of log analyzer 104 requests scores, referred to herein as "data element usefulness scores," from database 105 in order to evaluate the extent to which a value of a data element can be transformed. Such "usefulness scores" correspond to a value that represents the extent that such data elements are utilized, including in being advantageous or helpful in resolving software defects. In one embodiment, these usefulness scores are calculated by software testing assessment 204 of log analyzer 104 as discussed below.

In one embodiment, previous records of resolved defects (e.g., resolved GitHub® issues) are accessed. In one embodiment, such records may be identified on the Internet, publicly available databases as well as stored in database 105. In one embodiment, such records may be identified by software testing assessment 204 of log analyzer 104 utilizing natural language processing to identify records involving software defects or software errors that have been resolved, such as identifying terms, such as "error," "resolved," and "software." In one embodiment, software testing assessment 204 of log analyzer 104 counts the number of each element type (e.g., version of operating system, screen resolution) found in such records. The resulting count corresponds to the "usefulness scores" for the data elements (e.g., version of operating system, screen resolution).

In one embodiment, software testing assessment 204 of log analyzer 104 may conduct separate counts for different types of defects (e.g., null data errors, user interface errors).

In one embodiment, those elements (e.g., version of operating system) with a low usefulness score may be anonymized to a greater extent or removed altogether in comparison to those with a high usefulness score. As discussed above, "usefulness scores" correspond to a value that represents the extent that such data elements are utilized, including in being advantageous or helpful in resolving software defects. These data elements with a low usefulness score represent data elements that are not being utilized. As a result, such data elements can be anonymized to a greater extent or removed altogether in comparison to those with a high usefulness score. In contrast, those data elements with a high usefulness score represent data elements that are being utilized, including in being advantageous or helpful in resolving software defects, cannot be removed or anonymized to a greater extent.

In one embodiment, software testing variation creator 203 of log analyzer 104 generates new values for those data elements eligible for variation (i.e., those data elements containing personal data as discussed above in connection with steps 403-404). Such new data values are placed in log trace(s) of log files created by software testing variation creator 203. In one embodiment, the extent of the variation of the new values for those data elements eligible for variation is based on the usefulness scores, where those data elements with a lower usefulness score having a greater anonymization than those with a higher usefulness score.

In one embodiment, software testing variation creator 203 generates the new data (variations) in such a manner as to make them as distinct as possible from any individual. In one embodiment, software testing variation creator 203 generates the new data (variations) by using a feature vector of characteristics (e.g., user activity and/or device characteristics) in which the generated vector is placed in ambiguous positions (e.g., closer to other feature vectors) to increase entropy (randomness or uncertainty), such as incorporating behavioral characteristics of other users in the feature vector or deleting certain user activity and/or device characteristics. Furthermore, as discussed further below in connection with FIG. 8, such ambiguous positions may be represented by randomly adding and/or deleting edges and/or nodes in a session graph.

In one embodiment, software testing variation creator 203 generates the new data (variations) by truncating a portion of the data for those data elements whose values need to be modified. For example, the operating system of 13.0.2 may be truncated to reflect the value of 13. In another example, the date of a download of 2019-11-11 may be truncated to reflect the date of November 2019. In a further example, the visit path of Home>Menu to Scores>Select Week 2>Link to News may be truncated to the path of Week 2>Link to News. As previously discussed, the amount of truncation is based on the value of the usefulness scores for those data elements. The lower the value of the usefulness score, the greater the amount of truncation.

In one embodiment, software testing variation creator 203 generates the new data (variations) by removing the values of those data elements with a debugging value ($D_E$) less than a threshold value, indicating a low usefulness, and with an entropy (H(V)) lower than a threshold value, indicating a uniqueness in the data. Such data may not be included in the newly created trace(s) of the log file. In one embodiment, such threshold values for the debugging value and the entropy may be different as well as user-selected.

In one embodiment, software testing variation creator 203 generates the new data (variations) using a predefined seed to add random variations, such as random timestamp variations, for the interaction events.

An example of such new values is shown in FIGS. 6 and 7.

FIG. 6 illustrates the anonymized variations of personal data identified in the log files in accordance with an embodiment of the present disclosure. Referring to FIG. 6, exemplary unmodified and modified data elements (user activity and device characteristics) are listed showing various examples of software testing variation creator 203 generating variations of the values of the data elements. As shown in FIG. 6, the data elements corresponds to the device model 601, operating system 602, browser 603 and the referring site 604. The unmodified data elements for device model 601, operating system 602, browser 603 and the referring site 604 are the following: iPhone 11, IOS 13.1.3, Safari 13.0.5, and graycannon.com, respectively. The debug values for the element types of device model 601, operating system 602, browser 603 and the referring site 604 are the following: 0.75, 0.75, 0.75, and 0.25, respectively. The element occurrences in the data set for the element types of device model 601, operating system 602, browser 603 and the referring site 604 are the following: 2, 1, 3 and 1, respectively. The failure rate for the element for the element types of device model 601, operating system 602, browser 603 and the referring site 604 are the following: 0.50, 1.00, 1.00, and 1.00, respectively. The unmodified debug value for the element types of device model 601, operating system 602, browser 603 and the referring site 604 are the following: 0.38, 0.75, 0.75, and 0.25, respectively. The unmodified element entropy for the element types of device model 601, operating system 602, browser 603 and the referring site 604 are the following: 1.00, 0.00, 1.58, and 0.00, respectively. The debug value * element entropy for the element types of device model 601, operating system 602, browser 603 and the referring site 604 are the following: 0.38, 0.00, 1.19, and 0.00, respectively. The unmodified full vector entropy is 0.00.

The modified data elements for device model 601, operating system 602, browser 603 and the referring site 604 are the following: N/A (not applicable), IOS 13.3, Safari 13.0.5, and N/A, respectively. It is noted that N/A is included when such information is not included in the created log traces. The debug values for the element types of device model 601, operating system 602, browser 603 and the referring site 604 are the following: 0.75, 0.50, 0.75, and 0.25, respectively. The element occurrences in the data set for the element types of device model 601, operating system 602, browser 603 and the referring site 604 are the following: N/A, 2, 3, and N/A, respectively. The failure rate for the element for the element types of device model 601, operating system 602, browser 603 and the referring site 604 are the following: N/A, 1.00, 1.00, and N/A, respectively. The modified debug value for the element types of device model 601, operating system 602, browser 603 and the referring site 604 are the following: N/A, 0.50, 0.75, and N/A, respectively. The modified element entropy for the element types of device model 601, operating system 602, browser 603 and the referring site 604 are the following: N/A, 1.00, 1.58, and N/A, respectively. The debug value * element entropy for the element types of device model 601, operating system 602, browser 603 and the referring site 604 are the following: N/A, 0.50, 1.19, and N/A, respectively. The modified full vector entropy is 1.00.

Referring now to FIG. 7, FIG. 7 illustrates an example of modifying data values within data fields of a log file to anonymize personal data prior to creating a development task and test case in accordance with an embodiment of the present disclosure.

Referring to FIG. 7, FIG. 7 illustrates a server log 701 which has indicated that a user encountered a mobile application crash in the news section. The log provides various data fields that describe the crash event as discussed below.

For example, server log 701 includes various data fields 702, values for those fields 703, the entropy 704 (H(V)) for the data value, which is a measure of randomness or uncertainty, where the higher the value, the greater the privacy of the data value, and the debugging value 705 ($D_E$) for the data value, where the higher the value, the greater the value or usefulness of such data.

As illustrated in FIG. 7, server log 701 includes the data field 702 of visit path with a corresponding data value 703 of "Home>Menu to Scores>Select Week 2>Link to News," with a corresponding entropy 704 of medium and a corresponding debugging value 705 of high. Furthermore, server log 701 includes the data field 702 of user ID with a corresponding data value 703 of "gfcannon," with a corresponding entropy 704 of zero (unique identifier) and a corresponding debugging value 705 of zero (not useful). Additionally, server log 701 includes the data field 702 of operating system with a corresponding data value 703 of "13.0.2," with a corresponding entropy 704 of high and a corresponding debugging value 705 of medium. Furthermore, server log 701 includes the data field 702 of date of download with a corresponding data value 703 of "2019-11-11," with a corresponding entropy 704 of medium and a corresponding debugging value 705 of low.

In one embodiment, the ratings of entropy 704 and debugging value 705 from low to medium to high are based on the values of entropy 704 (H(V)) and debugging value 705 ($D_E$) being within certain ranges of values. For example, a first range of values of entropy 704 may represent a low entropy, a second range of values of entropy 704 may represent a medium entropy and a third range of values of entropy 704 may represent a high entropy. Such ranges may be user-specified.

In addition to calculating the individual entropy and debugging values as discussed above, log analyzer 104 may further calculate the cross-entropy (randomness) for combinations of data elements.

In one embodiment, considering the values discussed above in server log 701, log analyzer 104 makes the modifications shown in log file 706 of FIG. 7 before creating a development task and test case. Such modifications are placed in the created log trace(s) of the log file as discussed further below.

As shown in FIG. 7, log file 706 includes the modified data value 707 of "Week 2>Link to News" for the data field 702 of visit path. Furthermore, log file 706 includes discarding the value (shown in FIG. 7 as being not applicable (N/A)) for the modified data value 707 of the user ID data field 702. Additionally, log file 706 includes the modified data value 707 of 13 for the data field 702 of the operating system. Furthermore, log file 706 includes the modified data value of November 2019 for the data field 702 of the date of download.

In this manner, an individual's personal data is anonymized to prevent identification of the person.

Returning to FIG. 4, in conjunction with FIGS. 1-3 and 5-7, in step 406, software testing variation creator 203 creates log trace(s) containing the anonymized variations of personal data. A "log trace," as used herein, refers to the order of the statements that occur, such as during the execution of a test case. In particular, the log trace includes the flow of user interactions along with the values of the data elements associated with such user interactions and associated device characteristics.

In one embodiment, software testing variation creator 203 generates the trace(s) by randomly adding and/or deleting one or more of the edges and/or nodes in the session graph discussed above, such as the session graph discussed above in connection with FIG. 5. In one embodiment, such edges or nodes may be randomly deleted or inserted keeping topography graph properties as nodes, edges, density, the eccentricity distribution (distribution of eccentricities), where the eccentricities refer to deviations from an established pattern or norm, and the degree distribution.

An example of randomly deleting edges in the session graph of FIG. 5 is shown in FIG. 8. FIG. 8 illustrates the session graph of FIG. 5 modified to anonymize personal data, which is used to create log traces containing anonymized variations of personal data, in accordance with an embodiment of the present disclosure.

Referring to FIG. 8, session graph 800 is a modified version of session graph 500 of FIG. 5 in which software testing variation creator 203 randomly deleted edges 801, 802.

Returning to FIG. 4, in conjunction with FIGS. 1-3 and 5-8, in step 407, software testing variation creator 203 returns the anonymized log trace(s) in a log file to a software tester (e.g., computing device 106 of an analyst, artificial intelligence based entity) to create a test case for testing software without the software tester having access to personal data. In this manner, the software tester may reproduce the software errors without having access to the personal data.

In one embodiment, the software errors ("software bugs") identified can be registered in a development platform (e.g., GitHub®) together with the anonymized log traces allowing reproducibility and a test case.

In one embodiment, the software errors ("software bugs") can be priority ranked considering the task priority of the log traces.

In one embodiment, test cases are generated from the log trace(s) of the log file by executing the log trace(s), which include the order of the statements that occur during the execution of a test case.

In step 408, software testing is performed using the created test case for testing the software. As previously discussed, such a test case is created using the created log trace(s) which includes the flow of user interactions along with the values of the data elements associated with such user interactions and associated device characteristics. The test case, consisting of a specification of the inputs, execution conditions, testing procedure and expected results, is then executed to reproduce the software errors without access to personal data due to the personal data being anonymized in the log trace(s).

In this manner, the embodiments of the present disclosure provide a means for testing software by reproducing software defects ("software bugs") without having access to real data, including the individual's personal data. As a result, software testers (e.g., software developers) can reproduce the software defects ("software bugs") faced by real users without compromising users' privacy.

As a result of the foregoing, embodiments of the present disclosure provide a means for identifying, reproducing and solving software defects by combining seemingly non-identifying user data (e.g., user activity and device characteristics) without exposing users' personal data and violating regulations, such as the GDPR, by creating test cases for testing software using log files with anonymized personal data.

Furthermore, the present disclosure improves the technology or technical field involving software development. As discussed above, in recent years, there has been a trend in software development to identify, reproduce and solve software defects ("bugs") as quickly as possible. A software defect is an error, flaw or fault in a computer program or system that causes it to produce an incorrect or unexpected result, or to behave in unintended ways. Such defects may only occur under certain combinations of user activity and device characteristics. As a result, software developers may utilize such information (user activity and device characteristics) to identify, reproduce and solve software defects. However, by combining seemingly non-identifying user data (user activity and device characteristics), individual users may be uniquely identified. As a result, by analyzing such data, software developers may expose users' personal data to levels they did not consent. Furthermore, there are regulations, such as the General Data Protection Regulation (GDPR), on data protection and privacy. The aim of such regulations is to give individuals control over their personal data. Furthermore, such regulations may mandate that all access of user data should be clearly informed. However, in identifying, reproducing and solving software defects by combining user activity and device characteristics, software developers may not only expose users' personal data to levels they did not consent but may possibly violate regulations, such as the GDPR. As a result, attempts have been made to obfuscate or anonymize personal data. However, such attempts may fail to prevent uniquely identifying individuals by combining seemingly non-identifying user data (e.g., user activity and device characteristics). For example, current methods to obfuscate or anonymize personal data focus on anonymizing only profile data. Such methods do not consider the possibility of combining attributes in a manner that allows individual identification. Consequently, there is not currently a means for identifying, reproducing and solving software defects by combining seemingly non-identifying user data (e.g., user activity and device characteristics) without the possibility of exposing users' personal data to levels they did not consent and possibly violating regulations, such as the GDPR.

Embodiments of the present disclosure improve such technology by analyzing log files for indications of software defects resulting in software errors. "Log files," as used herein, contain a record of the user interaction data and device characteristics (e.g., operating system, device model) which have been "logged" by a computing device. In one embodiment, such log files that indicate software errors are identified via session graphs of expected user interaction data and device characteristics (e.g., expected user interaction behavior). For those log files that were found to indicate software errors, such log files are analyzed to determine if they contain personal data that needs to be anonymized based on an entropy score of the personal data. The entropy score is a score indicating the randomness or uncertainty of the personal data. When the entropy of the personal data is below a threshold value, personal data that needs to be anonymized may be said to be identified. After identifying the personal data that needs to be anonymized, anonymized variations of the personal data are generated based, at least in part, on a "usefulness score." Such "usefulness scores" correspond to a value that represents the extent that the data elements of the personal data are utilized, including in being advantageous or helpful in resolving software defects. Trace logs are then created containing the anonymized variations of the personal data, which is returned to a software tester to create a test case for testing software using the created trace logs without having access to personal data. Software is then tested using the created test case to reproduce the software errors. In this manner, the software tester may reproduce the software errors without having access to the personal data. Furthermore, in this manner, there is an improvement in the technical field involving software development.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating test cases for testing software, the method comprising:
   identifying personal data to be anonymized in a log file that was previously identified as indicating a software error based on an entropy score of said personal data;
   generating an anonymized variation of said identified personal data;
   creating one or more log traces containing said anonymized variation of said personal data; and
   returning said created one or more log traces containing said anonymized variation of said personal data to a software tester to create a test case for testing software using said created one or more log traces.

2. The method as recited in claim 1 further comprising:
   analyzing log files for indications of software defects resulting in software errors; and
   identifying one or more log files indicating software errors.

3. The method as recited in claim 1, wherein said test case is used to reproduce said software error without having access to said personal data.

4. The method as recited in claim 1 further comprising:
   performing software testing using said created test case.

5. The method as recited in claim 1, wherein said personal data to be anonymized is identified in said log file that was previously identified as indicating said software error by identifying one or more fields in said log file containing user interaction data and device characteristics, wherein said user interaction data and device characteristics are placed in a feature vector, wherein said personal data to be anonymized is identified when said feature vector has said entropy score below a threshold value.

6. The method as recited in 1, wherein said entropy score of said personal data is based on a number of issues of an issue type with a field present in an issue resolution component, a total number of resolved issues of said issue type, and a test case failure rate for a data element, wherein a value of said data element is eligible for variation in response to said entropy score of said personal data being less than a threshold value.

7. The method as recited in claim 1, wherein an amount of anonymized variations of data elements of said personal data is based on a usefulness score, wherein said usefulness score corresponds to a value that represents an extent that said data elements are utilized in resolving software defects.

8. A computer program product for generating test cases for testing software, the computer program product comprising one or more computer readable storage mediums having program code embodied therewith, the program code comprising programming instructions for:
   identifying personal data to be anonymized in a log file that was previously identified as indicating a software error based on an entropy score of said personal data;
   generating an anonymized variation of said identified personal data;
   creating one or more log traces containing said anonymized variation of said personal data; and
   returning said created one or more log traces containing said anonymized variation of said personal data to a software tester to create a test case for testing software using said created one or more log traces.

9. The computer program product as recited in claim 8, wherein the program code further comprises the programming instructions for:
   analyzing log files for indications of software defects resulting in software errors; and
   identifying one or more log files indicating software errors.

10. The computer program product as recited in claim 8, wherein said test case is used to reproduce said software error without having access to said personal data.

11. The computer program product as recited in claim 8, wherein the program code further comprises the programming instructions for:
   performing software testing using said created test case.

12. The computer program product as recited in claim 8, wherein said personal data to be anonymized is identified in said log file that was previously identified as indicating said software error by identifying one or more fields in said log file containing user interaction data and device characteristics, wherein said user interaction data and device characteristics are placed in a feature vector, wherein said personal data to be anonymized is identified when said feature vector has said entropy score below a threshold value.

13. The computer program product as recited in claim 8, wherein said entropy score of said personal data is based on a number of issues of an issue type with a field present in an issue resolution comment, a total number of resolved issues of said issue type, and a test case failure rate for a data element, wherein a value of said data element is eligible for variation in response to said entropy score of said personal data being less than a threshold value.

14. The computer program product as recited in claim 8, wherein an amount of anonymized variations of data elements of said personal data is based on a usefulness score, wherein said usefulness score corresponds to a value that represents an extent that said data elements are utilized in resolving software defects.

15. A system, comprising:
   a memory for storing a computer program for generating test cases for testing software; and
   a processor connected to said memory, wherein said processor is configured to execute program instructions of the computer program comprising:
      identifying personal data to be anonymized in a log file that was previously identified as indicating a software error based on an entropy score of said personal data;
      generating an anonymized variation of said identified personal data;
      creating one or more log traces containing said anonymized variation of said personal data; and
      returning said created one or more log traces containing said anonymized variation of said personal data to a software tester to create a test case for testing software using said created one or more log traces.

16. The system as recited in claim 15, wherein the program instructions of the computer program further comprise:
   analyzing log files for indications of software defects resulting in software errors; and
   identifying one or more log files indicating software errors.

17. The system as recited in claim 15, wherein said test case is used to reproduce said software error without having access to said personal data.

18. The system as recited in claim 15, wherein the program instructions of the computer program further comprise:
   performing software testing using said created test case.

19. The system as recited in claim 15, wherein said personal data to be anonymized is identified in said log file that was previously identified as indicating said software error by identifying one or more fields in said log file containing user interaction data and device characteristics, wherein said user interaction data and device characteristics are placed in a feature vector, wherein said personal data to be anonymized is identified when said feature vector has said entropy score below a threshold value.

20. The system as recited in 15, wherein said entropy score of said personal data is based on a number of issues of an issue type with a field present in an issue resolution comment, a total number of resolved issues of said issue type, and a test case failure rate for a data element, wherein a value of said data element is eligible for variation in response to said entropy score of said personal data being less than a threshold value.

* * * * *